United States Patent
Hammad et al.

(10) Patent No.: US 9,436,742 B1
(45) Date of Patent: Sep. 6, 2016

(54) RANKING SEARCH RESULT DOCUMENTS BASED ON USER ATTRIBUTES

(71) Applicant: Google Inc., Mountain View, CA (US)

(72) Inventors: Moustafa Hammad, San Jose, CA (US); Dandapani Sivakumar, Cupertino, CA (US); Pranav Kumar Tiwari, Bangalore (IN); Sumit Kumar Sanghai, Bangalore (IN); Shachi Dave, Bangalore (IN); Selvam Mahalingam, Bangalore (IN); Deepak Raghuwanshi, Bangalore (IN)

(73) Assignee: Google Inc., Mountain View, CA (US)

( * ) Notice: Subject to any disclaimer, the term of this patent is extended or adjusted under 35 U.S.C. 154(b) by 216 days.

(21) Appl. No.: 14/213,984

(22) Filed: Mar. 14, 2014

(51) Int. Cl.
    *G06F 17/30* (2006.01)
(52) U.S. Cl.
    CPC .................. *G06F 17/30554* (2013.01)
(58) Field of Classification Search
    CPC ............ G06F 17/3005; G06F 17/30554; G06F 17/30696; G06F 17/3087; G06F 17/30941; G06F 17/30991
    USPC .............. 707/723, 724, 725, 732–735
    See application file for complete search history.

(56) References Cited

U.S. PATENT DOCUMENTS

| | | | |
|---|---|---|---|
| 7,877,385 B2 | 1/2011 | Craswell et al. | |
| 8,510,294 B2 | 8/2013 | Tong et al. | |
| 8,515,975 B1 | 8/2013 | Federici | |
| 8,620,915 B1 | 12/2013 | Brukman et al. | |
| 8,898,259 B2* | 11/2014 | Chen | H04L 67/10 709/217 |
| 2002/0042793 A1 | 4/2002 | Choi | |
| 2011/0125739 A1* | 5/2011 | Wexler | G06F 17/30867 707/734 |
| 2012/0310929 A1* | 12/2012 | Patterson | G06F 17/30867 707/728 |

* cited by examiner

*Primary Examiner* — Hares Jami
(74) *Attorney, Agent, or Firm* — Middleton Reutlinger

(57) ABSTRACT

Methods and apparatus for ranking search result documents for a query of a user based on one or more attributes of the user that are associated with one or more of the search result documents. User attributes of the user's user profile may be matched to user attributes of a search result document and the search result document ranked based at least in part on bias measures associated with the matched user attributes. Some implementations are directed to determining, for each of a plurality of documents, multiple user attributes and associated bias measures to associate with the document. A user attribute and associated bias measure for the document may be determined based on indicated interactions with the document by a set of users associated with the user attribute.

19 Claims, 5 Drawing Sheets

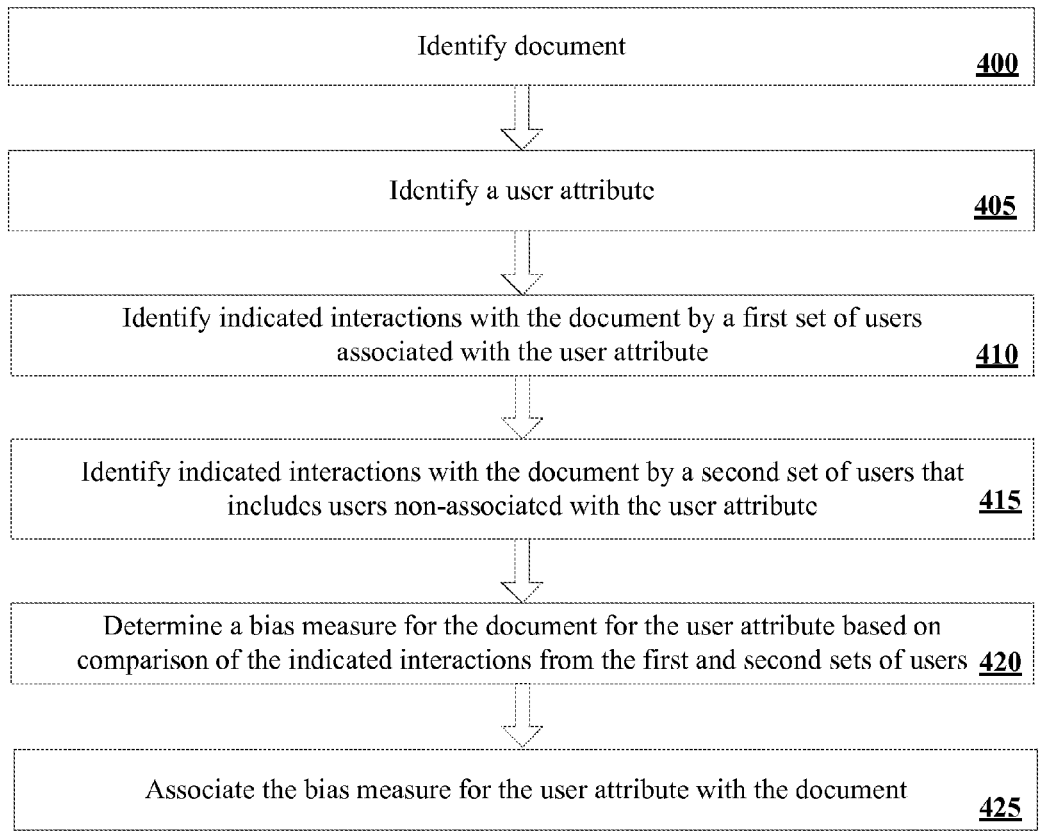

RANKING SEARCH RESULT DOCUMENTS BASED ON USER ATTRIBUTES

BACKGROUND

Search engines provide information about accessible documents such as web pages, images, text documents, and/or multimedia content. A search engine may identify the documents in response to a user's search query that includes one or more search terms. The search engine ranks the documents based on the relevance of the documents to the query and the importance of the documents and provides search results that include aspects of and/or links to the identified documents.

SUMMARY

This specification is directed generally to ranking search result documents, and, more particularly, to ranking search result documents for a query of a user based on one or more attributes of the user that are associated with one or more of the search result documents. Some implementations are directed generally to determining, for each of a plurality of documents, multiple user attributes and associated bias measures to associate with the document. Generally, a bias measure for a user attribute of a document indicates a likelihood of interaction with the document by users having that user attribute. A user attribute and associated bias measure for the document may be determined based on a database of indicated interactions with the document by a set of users associated with the user attribute. In some implementations, a user attribute and associated bias measure for a document may be determined based on indicated interactions with the document that collectively reflect interactions in response to multiple unique queries. Some implementations are directed generally to ranking search result documents for a user based on the user attributes and associated bias measures associated with the search result documents, and based on a user profile of the user. For example, a search result document may be ranked based on matching user attributes of the user's user profile to user attributes of the search result document, and ranking the search result document based at least in part on the bias measures associated with the matched user attributes.

In some implementations a computer implemented method may be provided that includes the steps of: identifying search result documents for a query submitted by a user; identifying one or more user attributes associated with the user; identifying, for a given document of the search result documents, a set of one or more of the user attributes that are each associated with the given document; identifying, for each of the user attributes of the set, a bias measure for the given document, wherein the bias measure for a user attribute of the set is based on a measure of indicated interactions with the given document by a set of users associated with the user attribute; determining an overall bias measure for the given document based on the bias measures for the user attributes of the set; and determining a ranking of the given document for the query based on the overall bias measure.

This method and other implementations of technology disclosed herein may each optionally include one or more of the following features.

In some implementations, the indicated interactions with the given document by the set of users associated with the user attribute include interactions with the given document independent of the query.

In some implementations, the method may further include: identifying, for a second document of the search result documents, an additional set of one or more of the user attributes that are each associated with the second document; identifying, for each of the user attributes of the additional set, a second document bias measure for the second document; determining a second document overall bias measure for the second document based on the second document bias measures for the user attributes of the additional set; and determining a ranking of the second document based on the second document overall bias measure. In some of those implementations, one or more of the user attributes of the set are not present in the additional set. In some of those implementations, the set and the additional set include one or more same of the user attributes.

In some of those implementations, determining the ranking of the given document for the query is further based on the second document overall bias measure for the second document. In some of those implementations, determining the ranking of the given document for the query includes: comparing the overall bias measure for the given document and the second document overall bias measure for the second document; and determining the ranking of the given document based on the comparison. In some of those implementations, the method further includes identifying the second document of the search result documents based on a rank of the second document for the query relative to the given document, the rank based on one or more factors independent of the overall bias measure and the second document overall bias measure. In some of those implementations, the method further includes identifying a second document navigational measure of the second document for the query, wherein determining the ranking of the given document for the query is further based on the second document navigational measure of the second document. In some of those implementations, the method further includes: identifying a navigational measure of the given document for the query, wherein determining the ranking of the given document for the query is further based on comparison of the navigational measure of the given document and the second document navigational measure of the second document.

In some implementations, the method further includes: identifying a second document navigational measure, for the query, of a second document of the search result documents; and identifying a navigational measure of the given document for the query; wherein determining the ranking of the given document for the query is further based on comparison of the navigational measure of the given document and the second document navigational measure of the second document.

In some implementations, the bias measure for the user attribute of the set is based on a quantity of indicated interactions with the given document by the set of users associated with the user attribute compared to a second quantity of indicated interactions with the given document by a second set of users, the second set of users including users non-associated with the user attribute.

In some implementations, one or more of the user attributes are based on documents indicated as interacted with by the user, the documents including documents in addition to the search result documents for the query.

In some implementations, the bias measure for a second user attribute of the set is based on a second measure of second indicated interactions with the given document by a second set of users associated with the second user attribute, the second indicated interactions including only interactions with the given document in response to the query.

In some implementations, a computer-implemented method may be provided that includes the steps of: identifying a first user attribute; identifying a given document; identifying first user attribute indicated interactions with the given document by a first set of users associated with the first user attribute, the first user attribute indicated interactions including indicated interactions with the given document in response to more than one query; identifying additional indicated interactions with the given document by a second set of users, the second set of users including users non-associated with the first user attribute and the indicated interactions including indicated interactions with the given document in response to more than one query; determining a bias measure for the given document for the first user attribute, the determining the bias measure based on comparison of the first user attribute indicated interactions and the additional indicated interactions; and associating the bias measure for the first user attribute with the given document.

This method and other implementations of technology disclosed herein may each optionally include one or more of the following features.

In some implementations, the method further includes: identifying a second user attribute; identifying second user attribute indicated interactions with the given document by a third set of users associated with the second user attribute, the second user attribute indicated interactions including indicated interactions with the given document in response to more than one query; determining a second user attribute bias measure for the given document for the second user attribute, the determining the second user attribute bias measure based on comparison of the third user attribute indicated interactions and the additional indicated interactions; and associating the second user attribute bias measure for the second user attribute with the given document. In some of those implementations, the third set of users includes one or more users not present in the set of users.

In some implementations, determining the bias measure includes comparison of a quantity of the third user attribute indicated interactions and a quantity of the additional indicated interactions. In some of those implementations, determining the bias measure includes comparing the quantity of first user attribute indicated interactions with a larger quantity of indicated interactions by the first set of users, the larger quantity of indicated interactions including interactions with documents in addition to the given document. In some of those implementations, determining the bias measure includes comparing the second quantity of the additional indicated interactions with a second larger quantity of indicated interactions by the second set of users, the second larger quantity of indicated interactions including interactions with the documents in addition to the given document.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein rank search result documents that are responsive to a search query. The search result documents are ranked based on one or more identified user attributes of a user submitting the search query and bias measures for the documents that are associated with the identified user attributes. The ranking of the search result documents may be utilized by one or more applications, such as a search system, to rank search results provided to the user.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is a flow chart illustrating an example method of determining a bias measure for a user attribute of a document based on indicated interactions with the document by a set of users associated with the user attribute.

FIG. 5 is an example of document identifiers and associated user attributes and bias measures.

DETAILED DESCRIPTION

Figure 1:
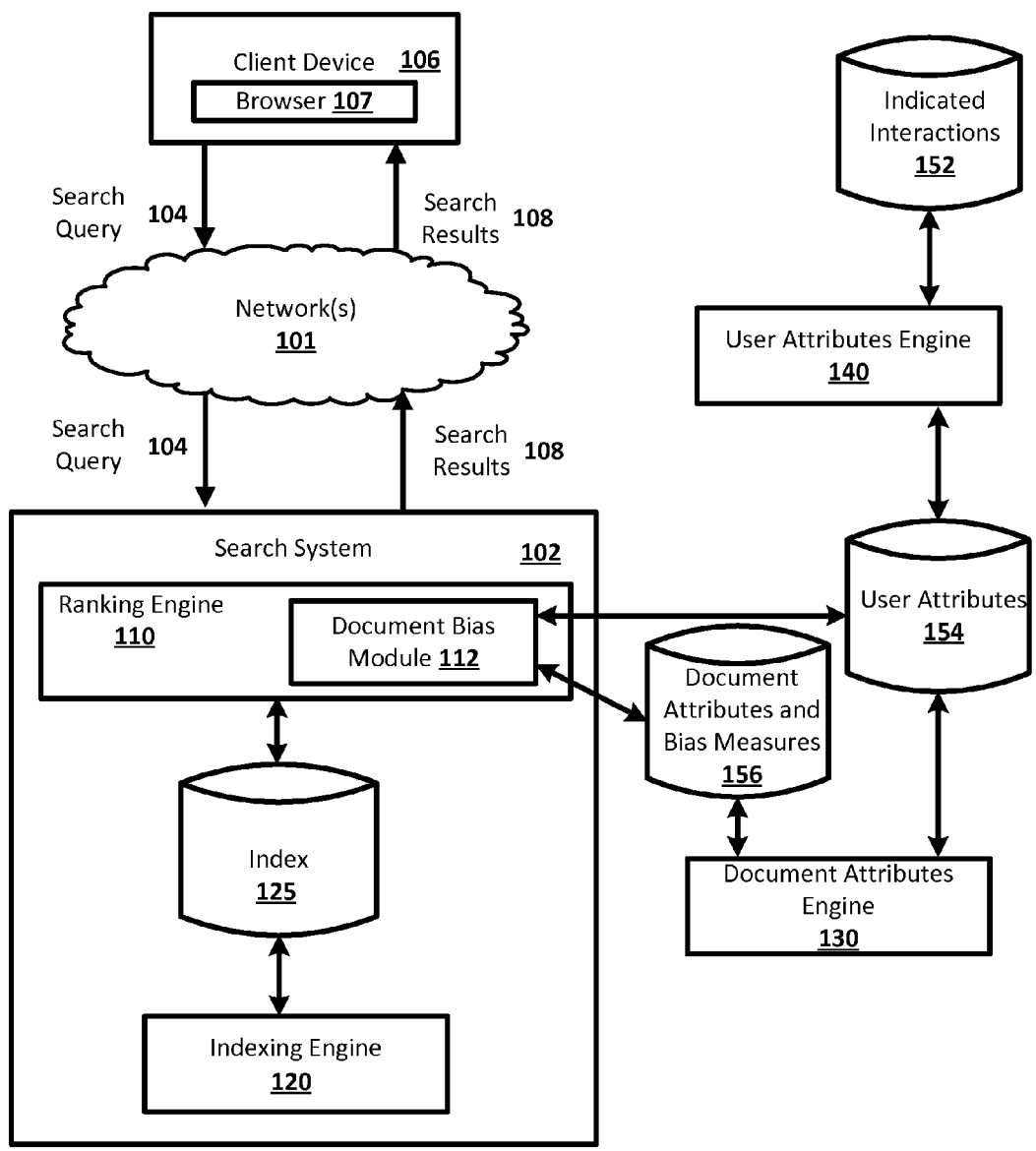
FIG. 1 illustrates an example environment in which search result documents may be ranked based on user attributes.

FIG. 1 illustrates an example environment in which search result documents may be ranked based on user attributes. The example environment includes a client device 106 and a search system 102. The search system 102 can be implemented in one or more computers that communicate, for example, through a network. The search system 102 is an example of an information retrieval system in which the systems, components, and techniques described herein may be implemented and/or with which systems, components, and techniques described herein may interface.

A user may interact with the search system 102 via the client device 106. The search system 102 receives search queries 104 from the client device 106 and returns search results 108 to the client device 106 in response to the search queries 104. Each search query 104 is a request for information. The search query 104 can be, for example, in a text form and/or in other forms such as, for example, audio form and/or image form. Other computer devices may submit search queries to the search system 102 such as additional client devices and/or one or more servers implementing a service for a website that has partnered with the provider of the search system 102. For brevity, however, the examples are described in the context of the client device 106.

The client device 106 may be a computer coupled to the search system 102 through one or more networks 101 such as a local area network (LAN) or wide area network (WAN) (e.g., the Internet). The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. The client device 106 typically includes one or more applications to facilitate submission of search queries and the sending and receiving of data over a network. For example, the client device 106 may execute one or more applications, such as a browser 107, that allow users to formulate queries and submit the queries to the search system 102.

The client device 106 and the search system 102 each include memory for storage of data and software applications, a processor for accessing data and executing applications, and components that facilitate communication over a network. The operations performed by the client device 106 and/or the search system 102 may be distributed across multiple computer systems. The search system 102 may be implemented as, for example, computer programs running on one or more computers in one or more locations that are coupled to each other through a network.

The search system 102 includes an indexing engine 120 and a ranking engine 110. The indexing engine 120 maintains an index 125 for use by the search system 102. The indexing engine 120 processes documents and updates index entries in the index 125, for example, using conventional and/or other indexing techniques. For example, the indexing engine 120 may crawl one or more resources such as the World Wide Web and index documents accessed via such crawling. Also, for example, the indexing engine 120 may receive information related to one or more documents from one or more resources such as web masters controlling such documents and index the documents based on such information. Also, for example, the indexing engine 120 may receive information from document attributes and bias measures database 156 (described in more detail herein) and index the documents based on such information. A document is any data that is associated with a document identifier such as, but not limited to, a uniform resource locator ("URL"). Documents include web pages, word processing documents, portable document format ("PDF") documents, images, videos, feed sources, calendar entries, task entries, to name just a few. Each document may include content such as, for example: text, images, videos, sounds, embedded information (e.g., meta information and/or hyperlinks); and/or embedded instructions (e.g., ECMAScript implementations such as JavaScript).

The ranking engine 110 uses the index 125 to identify documents responsive to the search query 104, for example, using conventional and/or other information retrieval techniques. The ranking engine 110 calculates scores for the documents identified as responsive to the search query 104, for example, using one or more ranking signals. Ranking signals may each provide, for example, information about the document itself, information about the search query, information about the relationship between the document and the search query 104, and/or information about the relationship between one or more user attributes associated with the user submitting the search query and one or more user attributes associated with the document.

In some implementations, ranking signals may include information about the search query 104 itself such as, for example, the terms of the query, an identifier of the user who submitted the query, and/or a categorization of the user who submitted the query (e.g., the geographic location from where the query was submitted, the language of the user who submitted the query, and/or a type of the client device 106 used to submit the query (e.g., mobile device, laptop, desktop)). The identifier of the user who submitted the query can be, for example, a user name or the IP address of the client device 106. The geographic location from where the search query 104 was submitted can be, for example, a continent, a country, a state, a city, or geographic coordinates, such as latitude and longitude.

Also, for example, ranking signals may additionally and/or alternatively include information about the terms of the search query 104 such as, for example, the locations where a query term appears in the title, body, and text of anchors in a document, where a query term appears in anchors pointing to the search result, how a term is used in the document (e.g., in the title of the document, in the body of the document, or in a link in the document), the term frequency (i.e., the number of times the term appears in a corpus of documents in the same language as the query divided by the total number of terms in the corpus), and/or the document frequency (i.e., the number of documents in a corpus of documents that contain the query term divided by the total number of documents in the corpus).

Also, for example, ranking signals may additionally and/or alternatively include information about the document such as, for example, a measure of the quality of the document, a measure of the popularity of the document, the URL of the document, the geographic location where the document is hosted, when the search system 102 first added the document to the index 125, the language of the document, the length of the title of the document, and/or the length of the text of source anchors for links pointing to the document.

Also, for example, ranking signals may additionally and/or alternatively include information about the relationship between one or more user attributes associated with the user submitting the search query and one or more user attributes associated with the document. As described herein, in some implementations the document bias module 112 of the ranking engine 110 may determine such one or more ranking signals for a document based on document attributes and bias measures database 156 and user attributes database 154. In some implementations, the ranking engine 110 may utilize such one or more determined ranking signals for a document in determining an initial ranking for the document. In some implementations, the ranking engine 110 may utilize other ranking signals for a document in determining an initial ranking for the document, and may adjust (promote or demote) the ranking for the document based on such one or more determined ranking signals. In some implementations, information from document attributes and bias measures database 156 may be included in the indexing engine 120. For example, an index entry for a document may include document attributes and associated bias measures for that document. Additional description is provided below regarding raking signals that include information about the relationship between one or more user attributes associated with the user submitting the search query and one or more user attributes associated with the document.

The ranking engine 110 ranks the responsive documents using the scores. The search system 102 uses the responsive documents ranked by the ranking engine 110 to generate search results 108. The search results 108 include search results corresponding to the documents responsive to the search query 104. For example, each of one or more search results 108 can include a title of a respective of the documents, a link to a respective of the documents, and/or a summary of content from a respective of the documents that is responsive to the search query 104. For example, the summary of content may include a particular "snippet" or section of the document that is responsive to the search query 104. Also, for example, for a search result associated with an image document, the search result may include a reduced size display of the image document, a title associated with the image document, and/or a link to the image document. Also, for example, for a search result associated with a video document, the search result may include an image from the video, a segment of the video, a title of the video, and/or a link to the video. Other examples of search results 108 include a summary of information responsive to the search query 104 and/or an answer responsive to the search query 104. The summary and/or answer can be generated from documents responsive to the search query 104 and/or from other sources.

The search results 108 are transmitted to the client device 106 in a form that may be presented to the user. For example, the search results 108 may be transmitted as a search results web page to be displayed via the browser 107 executing on the client device 106 and/or as one or more search results conveyed to a user via audio.

The search results 108 may be presented to the user based on the ranking of the corresponding search result documents. For example, when the search results 108 are presented as a search results webpage, the search results 108 may be displayed based on the ranking of the corresponding search result documents. For example, the most prominently displayed search result may be the highest ranked search result, the next most prominently displayed search result may be the second highest ranked search result, and so forth. In some implementations, a presentation of search results 108 may include a subset of all of the search results for a search query. For example, an initial search results webpage may include the top X ranked search results 108 and may include a link to view additional search results webpages that each includes additional search results ranked lower than the top X ranked search results. Thus, in some implementations, search result documents that are ranked based on one or more user attributes, and utilized to determine search results 108 to transmit to client device 106, may be only a subset of all search result documents responsive to the search query 104.

As described above, ranking signals for a document may include information about the relationship between one or more user attributes associated with the user submitting the search query and one or more user attributes associated with the document. The one or more user attributes of the user submitting the search query may be identified from user attributes database 154. Also, in some implementations, the one or more user attributes of the document may be identified from the document attributes and bias measures database 156. As described herein, one or more of the user attributes of the document attributes and bias measure database 156 may be determined based on information from the user attributes database 154.

The user attributes database 154 may include one or more storage mediums. For each of a plurality of users, the user attributes database 154 may include an identifier of the user (e.g., a user ID or other identifier) and identifiers of one or more user attributes associated with the user. For example, user attributes of a user may be stored as a vector of user attributes that are associated with the user. In some implementations, access to user attributes of a user in the user attributes database 154 may be allowed for only the user and/or one or more other users or components authorized by the user such as document attributes engine 130, user attributes engine 140, and/or document bias module 112. In some implementations, each user may have control over whether and/or which user attributes of the user may be provided for inclusion in the user attributes database 154. In some implementations, each user may have control over whether and/or how user attributes of the user included in the user attributes database 154 are utilized in ranking search result documents. In some implementations, each user may have the ability to remove user attributes of the user included in the user attributes database 154.

In some implementations, the user attributes engine 140 may determine one or more of the user attributes of the user attributes database 154 based on information in an indicated interactions database 152. Indicated interactions database 152 may include one or more storage mediums and, for each of a plurality of users, include identifiers of documents indicated as interacted with by the user. For example, for each of a plurality of users, identifiers of documents interacted with by the user via one or more computing devices such as client device 106 and/or other computing device(s) of the user may be included in the interactions database 152. Interactions with documents by a user may occur via one or more applications executable on the client device 106 and/or other computing device(s), such as browser 107, an e-mail application, a social networking application, a photo viewing application, etc. In some implementations, one or more identifiers of users and/or documents that may be included in the indicated interactions database 152 may be anonymized. Indicated interactions database 152 may also include, for each document indicated as interacted with, an indication of the quantity of interactions with the document. For example, indicated interactions database 152 may include, for a given user, identifiers of documents selected by the user in response to search queries issued by the user, and, for each document, an indication of the number of selections of the document by the user. For example, the search system 102 may provide information related to documents selected by the user in response to search queries of the user and the information may be stored in indicated interactions database 152.

In some implementations, indicated interactions database 152 may additionally and/or alternatively include information related to documents indicated as interacted with by the user via one or more applications besides the search system 102. For example, an identifier of a document indicated as interacted with by the user may be based on a webpage document visited by the user via browser 107 and/or other application—without necessarily being visited in response to a query. Also, for example, an identifier of a document indicated as interacted with by the user may be based on a calendar entry document created in response to input of the user via a calendar application and/or other application. Also, for example, an identifier of a document indicated as interacted with by the user may be based on an image, a post, and/or other documents viewed by a user via a social networking application and/or other application. The browser 107 and/or other applications (executing on the computing device 105 or remotely) may optionally provide information related to the interacted with documents with permission of the user.

In some implementations, access to indicated interactions of a user in the indicated interactions database 152 may be allowed only for the user and/or one or more other users or components authorized by the user such as document attributes engine 130 and/or user attributes engine 140. In some implementations, each user may have control over whether and/or which indicated interactions of the user may be provided for inclusion in the indicated interactions database 152. For example, a user may have control over whether the search system 102 provides information related to documents selected by the user in response to queries for inclusion in the indicated interactions database 152. In some implementations, each user may have the ability to remove indicated interactions of the user included in the indicated interactions database 152.

In this specification, the term "database" and "index" will be used broadly to refer to any collection of data. The data of the database and/or the index does not need to be structured in any particular way and it can be stored on storage devices in one or more geographic locations. Thus, for example, the databases 152, 154, and/or 156 may each include multiple collections of data, each of which may be organized and accessed differently. Also, for example, all or portions of the databases 152, 154, and/or 156 may be combined into one database and/or may contain pointers and/or other links between entries in the database.

Figures 2, 3:
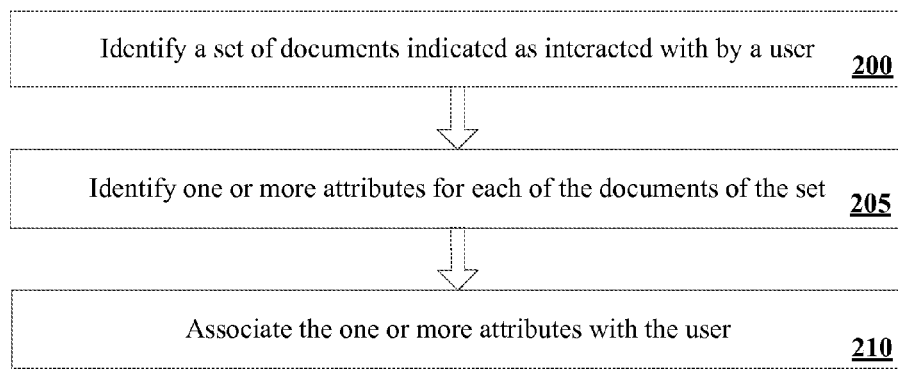
FIG. 2 is a flow chart illustrating an example method of determining user attributes for a user based on a set of documents indicated as interacted with by the user.
FIG. 3 is an example of indicated interactions and user attributes determined based on the indicated interactions.

With reference to FIGS. 2 and 3, examples are provided of determining user attributes of a user based on a set of documents indicated as interacted with by the user. FIG. 2 is a flow chart illustrating an example method of determining attributes for a user based on a set of documents indicated as interacted with by the user. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the user attributes engine 140 of FIG. 2.

At step 200, a set of documents indicated as interacted with by a user is identified. In some implementations, the user attributes engine 140 may identify the set of documents from the indicated interactions database 152. For example, the indicated interactions database 152 may include, for the user, identifiers of documents selected by the user in response to search queries issued by the user, and, for each document, an indication of the number of selections of the document by the user. For example, document D1 may have been selected by the user: thirty times in response to a first query Q1, ten times in response to a second query Q2, and ten times in response to a third query Q3. One or more aspects of the queries Q1-Q3 may be unique from one another. For example, each of the queries Q1-Q3 may include one or more terms that are unique from terms of the other queries. As one example, document D1 may be a document related to a widget store in San Francisco and: query Q1 may be "Widgets in San Franciso"; query Q2 may be "Businesses in California"; and query Q3 may be "Where can I buy widgets?". In some implementations, the search system 102 may provide information related to selection of document D1 by the user in response to the queries Q1, Q2, and Q3 and the information may be stored in indicated interactions database 152. For example, the indicated interactions database may include an identifier of document D1 such as a URL or other identifier, and an indication of the quantity of indicated interactions with document D1 such as the number 50.

In some implementations, all documents indicated as interacted with by a user are identified for inclusion in the set of documents identified at step 200. In some other implementations, the set is restricted to a subset of documents based on one or more criteria. For example, in some implementations the set may be restricted to documents indicated as interacted with in a certain time period such as within the last 6 months. Also, for example, in some implementations the set may be restricted to the X documents indicated as interacted with the greatest quantity of times by the user. For example, the 200 documents indicated as interacted with the greatest quantity of times may be selected for inclusion in the set. Also, for example, in some implementations the set may be restricted to documents that are indicated as interacted with at least X times by the user. Also, for example, in some implementations the set may be restricted to documents that are associated with a white-list of documents such as the 300,000 documents interacted with the greatest amount by a set of users such as all users. Additional and/or alternative criteria may optionally be utilized to restrict the set.

With reference to FIG. 3, an example of a set of indicated interactions 152A of a user is provided. The set of indicated interactions 152A is an example of a set of indicated interactions from the indicated interactions database 152 and are all associated with one user. The indicated interactions 152A include documents $D_1$-$D_5$ and indications of the quantity of interactions with each of the documents (e.g., 50 interactions with document $D_1$). Although five documents are illustrated in the example of FIG. 3, it is understood that more or fewer indicated interactions with documents may be included for a user. The indicated interactions 152A also include document attributes $A_1$-$A_4$, described in more detail with respect to step 205. In some implementations, the document attributes $A_1$-$A_4$ may be omitted from the indicated interactions 152A.

At step 205, one or more attributes are identified for each of the documents of the set of documents identified at step 200. Generally, an attribute of a document is one or more features of the document that identify the document, that identify content associated with the document, and/or that identify features related to interactions with the document. In some implementations, a feature that identifies the document may include one or more identifiers such as a URL of the document (e.g., "www.exampleurl.com/document1"), a domain at which the document is hosted (e.g., "www.exampleurl.com"), and/or other identifier of the document (e.g., a unique alphanumeric identifier that is not a URL). In some implementations, a feature that identifies content associated with the document may include one or more entities associated with the document. An entity associated with a document may include, for example, a topic associated with the document (e.g., news, sports, technology news, Olympic sports), a site cluster to which the document belongs (e.g., a technology blogs cluster, an Olympics sports blogs cluster), and/or entities discussed in the document (e.g., the most prominent entity, the X most prominent entities, entities discussed with at least a threshold level of prominence). In some implementations, a feature related to interactions with the document may include information related to one or more users who interacted with the document, times and/or dates of interaction with the document, applications used to access the document, and/or other features related to interactions with the document but not necessarily determinable directly from the document. In some implementations, an identified attribute may be a single attribute, such as a single document identifier or single entity. In some implementations, an identified attribute may be a pair or other n-tuple of attributes. For example, an identified attribute for a document may be a pair of a topic associated with the document and a site cluster to which the document belongs.

In some implementations, the indicated interactions database 152 may include, for each of one or more documents, identifiers of one or more attributes for the document. For example, the indicated interactions 152A each include a document attribute ($A_X$) associated with the document. In some implementations, the user attributes engine 140 may determine an entity and/or other attribute that is associated with a document by referencing a database that contains information related to one or more entities or other attributes associated with a document. For example, the user attributes engine may determine an identifier of the document and utilize the identifier as an attribute of the document. Also, for example, index 125 may contain, for each of a plurality of documents, a mapping between the document and one or more entities related with the document, and the index 125 may be referenced to identify one or more entities associated with the documents.

In some implementations, the index 125 may include index entries that associate each of one or more documents with a respective one or more entities associated with the document. For example, for each of a plurality of documents, a mapping (e.g., data defining an association) between the document and one or more entities associated with the document may be identified in the index 125. In some implementations, an index of documents and associated entities may be provided in an index or other database that is separate from the index 125. In some implementations entities are topics of discourse. In some implementations, entities are persons, places, concepts, and/or things that can be referred to by a text fragment (e.g., a term or phrase) and are distinguishable from one another (e.g., based on context). For example, the text "bush" on a webpage may potentially refer to multiple entities such as President George Herbert Walker Bush, President George Walker Bush, a shrub, and the rock band Bush. In some implementations, an entity may be referenced by a unique entity identifier that may be used to identify the entity. In some examples in this specification, an entity may be referenced with respect to a unique entity identifier. In some other examples, the entity may be referenced with respect to one or more alias and/or other property of the entity.

In some implementations, a document may only be mapped to a single entity. For example, the document may only focus on the single entity and/or the single entity may be determined to be more important to the document than one or more other entities. In some implementations, a document may be mapped to multiple entities. In some of those implementations scores may be associated with the multiple entities and the scores may indicate the strength of the association of the entity to the document. For example, scores from 0 to 1 may be associated with each of the entities, with 1 being most indicative of association of the entity to the document. In some implementations, an association between a document and an entity may be based on presence of one or more properties of the entity in the document. For example, an association between a document and an entity may be based on an importance of one or more alias of the entity in the document. For example, appearance of an alias of an entity in important fields and/or with great frequency in a document may be indicative of association of the entity to the document. Also, for example, an association between a document and an entity may be based on presence of additional and/or alternative properties of an entity such as date of birth, place of birth, height, weight, population, geographic location(s), type of entity (e.g., person, actor, location, business, university), etc. In some implementations, an association between a document and an entity may be based on presence in the document of one or more other entities related the entity.

At step 210, one or more of the attributes identified at step 205 are associated with the user. In some implementations, all of the attributes identified at step 205 are associated with the user. In some other implementations, the attributes identified at step 205 that are associated with the user are restricted to a subset of attributes based on one or more criteria. For example, in some implementations only attributes associated with the greatest number of indicated interactions may be utilized. In some implementations, a weight may optionally be associated with one or more of the attributes that are associated with the user. In some of those implementations, the weight of an attribute may be based at least in part on the quantity of indicated interactions with documents associated with the attribute. For example, the weight may be the number of indicated interactions with the documents and/or may be the number of indicated interactions compared to another quantity of indicated interactions—such as all indicated interactions of the user. In some of those implementations, the weight of an attribute may additionally and/or alternatively be based at least in part on optional weight(s) of the attribute for the documents associated with the attribute.

With reference to FIG. 3, an example of a set of user attributes 154A associated with a user is provided. The set of user attributes 154A is an example of user attributes from the user attributes database 154 and the user attributes 154A are all associated with one user. The user attributes 154A are determined based on the indicated interactions 152A of FIG. 3. The indicated user attributes 154A include attributes $A_1$-$A_4$ and weights for each of the attributes (e.g., a weight of 50 for attribute $A_1$). It is noted that attribute $A_4$ includes a weight that is based on indicated interactions with document $D_4$ and document $D_5$, which are both associated with the attribute $A_4$. Although four attributes and associated weights are illustrated in the example of FIG. 3, it is understood that more or fewer attributes may be included for a user. In some implementations, the weights for user attributes may be omitted. Also, in some implementations one or more user attributes may be associated with a user that are not determined based on documents indicated as interacted with by a user. For example, in some implementations, a user may also be associated with additional and/or alternative features determined from other sources such as user input. For example, the user may provide the user's gender and/or enable discovery of the user's location and such attributes may also be associated with the user.

The steps of FIG. 2 may be repeated for each of a plurality of users to determine attributes for each of the users, and to associate the determined attributes with the users. In some implementations, the steps of FIG. 2 and/or other steps may be performed on a periodic or other basis to update user attributes associated with users.

As described above, ranking signals for a document may include information about the relationship between one or more user attributes associated with the user submitting the search query and one or more user attributes associated with the document. The one or more user attributes associated with the document may be identified from the document attributes and bias measures database 156. The document attributes and bias measures database 156 may include one or more storage mediums. For each of a plurality of documents, the database 156 may include an identifier of the document and identifiers of one or more user attributes and associated bias measures associated with the document. For example, a document may be associated with a vector of user attribute, bias measure pairs. In some implementations, the document attributes engine 130 may determine one or more of the user attributes and bias measures of the database 156 based on user attributes database 154 and/or indicated interactions database 152.

With reference to FIGS. 4 and 5, examples are provided of determining a bias measure for a user attribute of a document based on indicated interactions with the document by a set of users associated with the user attribute. FIG. 4 is a flow chart illustrating an example method of determining a bias measure for a user attribute of a document based on indicated interactions with the document by a set of users associated with the user attribute. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the document attributes engine 130 of FIG. 1.

At step 400, a document is identified. For example, the document attributes engine 130 may identify a document from the index 125, the user attributes database 154, the indicated interactions database 152, and/or other database. In some implementations, the document attributes engine 130 may identify only documents that are indicated as being interacted with by at least a threshold quantity of users (e.g., at least 50 users) and/or indicated as being interacted with at least a threshold quantity of times (e.g., at least 50 times by any quantity of users or by at least a threshold quantity of users). A quantity of interactions with a document and/or a quantity of users that have interacted with a document may be determined, for example, based on user attributes database 154 and/or indicated interactions database 152. For example, data from indicated interactions database 152 may be utilized to determine a sum of indicated interactions among all users for each of the documents of the indicated interactions database 152.

At step 405, a user attribute is identified. For example, the document attributes engine 130 may identify a user attribute from the user attributes database 154, the indicated interactions database 152, and/or other database. In some implementations, the document attributes engine 130 may identify a user attribute based on the user attribute being associated with the document in user attributes database 154 and/or indicated interactions database 152. For example, in some implementations the user attributes of user attributes database 154 may each include an identifier of the document(s) with which they are associated and/or may be mapped to a document identifier of the document. For example, the user attributes of user attributes database 154 may include or be mapped to one or more document identifiers reflecting the underlying document(s) that contributed to the user attribute. In some implementations, the user attribute may itself be an identifier of a document. In some implementations, the user attribute may be a pair or other n-tuple of user attributes.

At step 410, indicated interactions with the document by a first set of users associated with the user attribute are identified. For example, the document attributes engine 130 may identify all users having the user attribute from user attributes database 154. The document attributes engine 130 may then access indicated interactions database 152 to determine how many of the users having the user attribute have an indicated interaction with the document and/or how many indicated interactions there are among users having the user attribute. In some implementations, the user attributes database 154 may itself include information related to the quantity of user interactions with a document. In some implementations, optional weights associated with the user attribute for the first set of users may also be identified from user attributes database 154 at step 410.

At step 415, indicated interactions with the document by a second set of users are identified. The second set of users includes users non-associated with the user attribute identified at step 405. In some implementations, the second set of users may include all users represented by the user attributes database 154 and/or indicated interactions database 152. For example, the document attributes engine 130 may access indicated interactions database 152 to determine how many users (regardless of associated user attributes) have an indicated interaction with the document and/or how many indicated interactions there are among all users (regardless of associated user attributes). In some implementations, optional weights associated with the user attribute for the second set of users may also be identified from user attributes database 154. In some implementations, the second set of users may include only users non-associated with the user attribute identified at step 405. For example, the document attributes engine 130 may access indicated interactions database 152 to determine how many users who lack association with the users attribute identified at step 405 have an indicated interaction with the document.

At step 420, a bias measure is determined for the document for the user attribute. The bias measure is based on comparison of the indicated interactions from the first and second sets of users. Generally, the bias measure for the document for the user attribute indicates a likelihood of selection of the document by users having that user attribute. The bias measure may indicate how much more or less likely users having the user attribute are to interact with a document as compared to a second population of users that include users non-associated with the user attribute (such as all users, including users with the user attribute). In some implementations, the bias measure may be determined based on comparison of a quantity of indicated interactions identified at step 410 and a quantity of indicated interactions identified at step 415. For example, in some implementations the bias measure may be based on the following equation:

$$\text{bias measure(document,user attribute)} = \text{interactions (document,user attribute)/interactions (document)};$$

wherein interactions (document, user attribute) indicates the quantity of indicated interactions with the document among users having the user attribute (e.g., the quantity of indicated interactions or the quantity of users having the user attribute with indicated interactions); and wherein interactions (document) indicates the quantity of indicated interactions with the document among a set of users including users non-associated with the user attribute (e.g., the quantity of indicated interactions among all users or the number of users among all users with indicated interactions).

Also, for example, in some implementations the bias measure may be based on the following equation:

$$\text{bias measure(document,user attribute)} = [\text{interactions (document,user attribute)/interactions(user attribute)}]/[\text{interactions(document)/interactions}(*)],$$

wherein interactions (document, user attribute) and interactions (document) indicate the same information as provided above; wherein interactions (user attribute) indicates the quantity of indicated interactions with a larger set of documents, such as all documents, among users having the user attribute; and wherein interactions (*) indicates the quantity of indicated interactions with a larger set of documents, such as all documents, among a set of users including users non-associated with the user attribute.

Based on the preceding two equations, the larger the bias measure is, the stronger the association of the user attribute to the document will be. Conversely, the smaller the bias measure is, the weaker the association of the user attribute to the document will be. Other equations may be utilized wherein a larger bias measure indicates a weaker association of the user attribute to the document and a smaller bias measure indicates a stronger association. Also, based on the preceding two equations, a bias measure for a document for a user attribute may take into account indicated interactions with the document in response to multiple unique queries, as the analyzed indicated interactions with the document may include selections responsive to multiple queries that are unique in one or more respects. In implementations where optional weights associated with user attributes are identified from user attributes database 154, the weights may optionally be taken into account in determining a bias measure for a user attribute. For example, indicated interactions of users having a strong weight for the user attribute may be weighted more heavily in determining a bias measure than indicated interactions of users having a weak weight for the user attribute.

At step 425, the bias measure for the user attribute is associated with the document. For example, the document attributes engine 130 may associate the bias measure and the user attribute with the document in document attributes and bias measures database 156. In some implementations, the bias measure and the user attribute are only associated with the document in database 156 if certain criteria are met. In some implementations, the criteria may be selected to retain those user attributes and bias measures that indicate the most meaningful bias for and/or against a document. In other words, the criteria may be selected to retain those user attributes and associated bias measures that represent a significant bias for and/or against the document. For example, in some implementations only the X highest bias measures and associated user attributes and/or the X lowest bias measures and associated user attributes may be retained. Also, for example, only the bias measures and associated user attributes that satisfy a threshold high value and/or only the bias measures and associated user attributes that fail to satisfy a threshold low value may be retained. Also, for example, in some implementations determined bias measures for user attributes for a document may be normalized and only those user attributes and associated bias measures whose bias measures fall above and/or below a threshold may be retained. For example, only those user attributes and associated bias measures that are outside of one standard deviation of a mean bias measure may be retained. Additional and/or alternative criteria may be utilized.

In implementations where criteria are utilized to only associate certain user attributes and bias measures with a document, one or more documents may be associated with a set of user attributes that are unique from the user attributes of one or more other documents. For example, for a first document, a first set of fifty user attributes may represent a meaningful bias for and/or against the first document; whereas for a second document, a second set of fifty user attributes may represent a meaningful bias for and/or against the document. The second set may include one or more user attributes that are unique from the first set.

The steps of FIG. 4 may be repeated for each of a plurality of additional user attributes to determine bias measures for each of the additional user attributes and optionally associate the additional user attributes and bias measures with the document. Moreover, the steps of FIG. 4 may be repeated for each of a plurality of additional documents to determine bias measures for user attributes for each of the additional documents. In some implementations, the steps of FIG. 4 and/or other steps may be performed on a periodic or other basis to update user attributes and/or bias measures associated with documents.

With reference to FIG. 5, an example of entries of document attributes and bias measures database 160 is provided. The entries include entry 1561, 1562, through 156X, with entries for multiple documents being present between entries 1562 and 156X (but not illustrated for brevity). The example entry 1561 includes a document identifier of $D_1$ and a set of document attributes and associated bias measures enclosed in brackets "< >". For example, user attribute $A_1$ has a bias measure of 0.8. The example entries 1562 through 156X likewise include document identifiers and a set of document attributes and associated bias measures. As described herein, in some implementations each of one or more of the user attributes $A_1$, $A_2$, etc. may be an identifier for a document. Thus, in those implementations the user attributes for a given document may reflect other documents interacted with that may represent a bias for and/or against an interaction with the given document.

Figure 6:
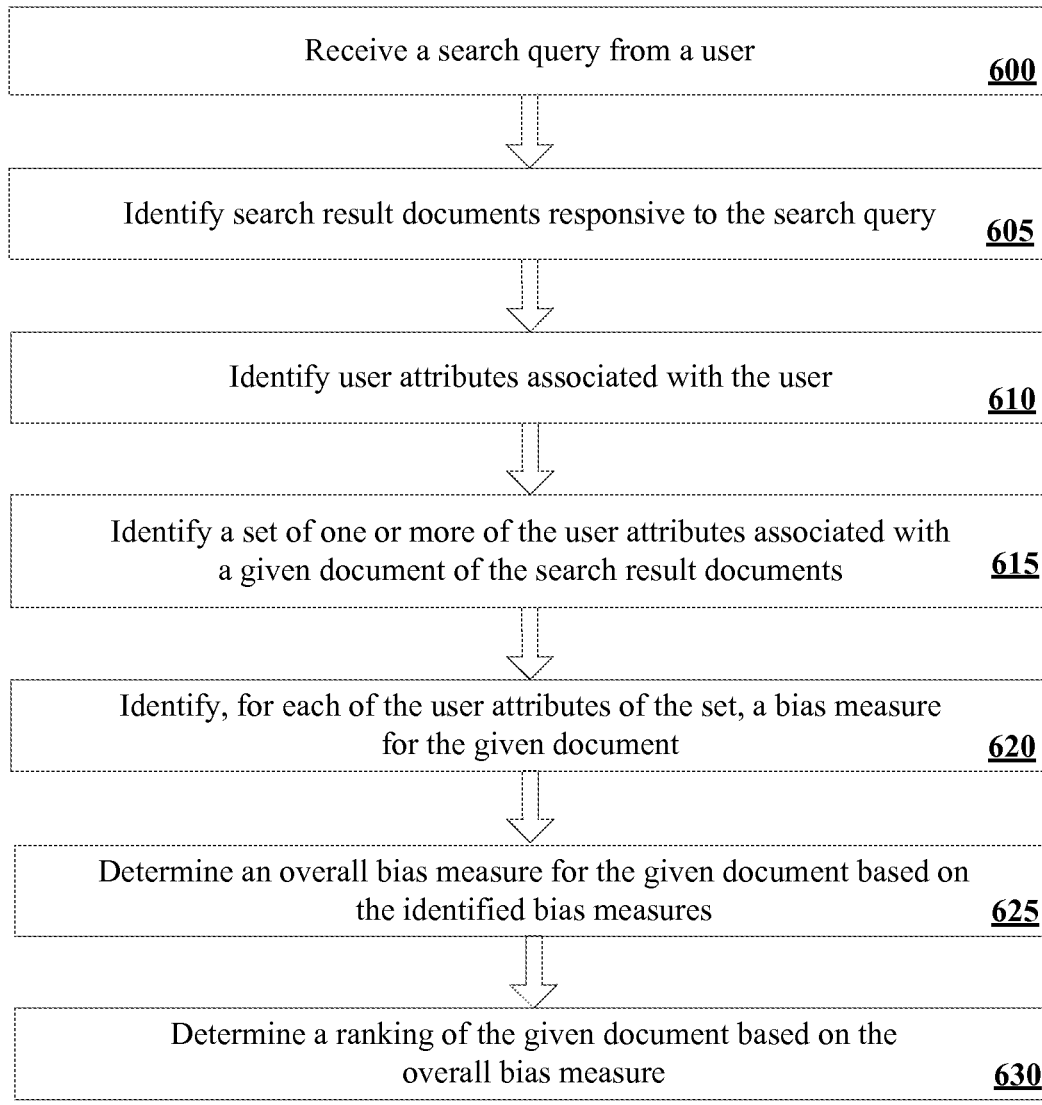
FIG. 6 is a flow chart illustrating an example method of ranking a search result document based on one or more attributes of a user that are associated with the search result document.

FIG. 6 is a flow chart illustrating an example method of ranking a search result document based on one or more user attributes of a user that are associated with the search result document. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, one or more components of the search system 102 of FIG. 1 such as the document bias module 112 and/or the ranking engine 110.

At step 600, a search query is received. In some implementations the search system 102 may receive the search query from a computing device such as client device 106.

At step 605, search result documents are identified based on the search query received at step 600. For example, in some implementations the ranking engine 110 may use the index 125 to identify documents responsive to the search query.

At step 610, user attributes associated with the user that submitted the search query are identified. For example, in some implementations the document bias module 112 may identify user attributes associated with the user from the user attributes database 154. In some implementations, an identifier associated with the user may be utilized to identify user attributes associated with the identifier in the user attributes database 154. In some implementations, optional weights associated with the user attributes may also be identified. As one example, user attributes 154A of FIG. 3 may be user attributes identified for the user.

At step 615, a set of one or more of the user attributes are identified that are associated with a given document of the search result documents. For example, the document bias module 112 may determine, for a given search result document of the search result documents identified at step 610, a set of user attributes that are associated with the search result document. For example, the document bias module 112 may identify, for the given search result document, a set of user attributes associated with the document from document attributes and bias measures database 156. As one example, user attributes of document entry 1561 may be identified.

The document bias module 112 may identify those user attributes that are associated with the search result document that match the user attributes associated with the user and identified at step 610. Exact matching and/or soft matching between user attributes associated with the user and user attributes associated with the document may be utilized. As one example, user attributes $A_1$ and $A_2$ of document entry 1561 match user attributes $A_1$ and $A_2$ of user attributes 154A.

At step 620, a bias measure for the given document is identified for each of the user attributes of the set identified at step 615. For example, the document bias module 112 may identify the bias measures from document attributes and bias measures database 156. As one example, user attribute $A_1$ of document entry 1561 has a bias measure of 0.8 and user attribute $A_2$ of document entry 1561 has a bias measure of 2.25.

At step 625, an overall bias measure for the given document is determined based on the bias measures identified at step 620. For example, the overall bias measure may be determined based on a maximum bias measure, a minimum bias measure, an average bias measure or other aggregate score based on the bias measures identified at step 625. As one example, an average of the bias measures of user attributes $A_1$ and $A_2$ of document entry 1561 may be determined. In implementations in which weights for user attributes associated with a user are determined at step 610, the weights may optionally be utilized in determining an overall bias measure. For example, those bias measures associated with user attributes having a strong weight for a user may be weighted more heavily in an overall bias measure determination than those bias measures associated with user attributes having a weak weight for a user.

At step 630, a ranking of the given document is determined based on the overall bias measure determined at step 625. In some implementations, the ranking engine 110 may utilize other ranking signals for the given document in determining an initial ranking for the given document, and document bias module 112 may adjust (promote or demote) the ranking for the document based on the overall bias measure. In some implementations, the overall bias measure may be utilized in determining an initial ranking of the given document. Generally, an overall bias measure that indicates a strong likelihood of interaction with the document may promote the ranking of the document, whereas an overall bias measure that indicates a weak likelihood of interaction with the document may demote the ranking of the document. As described below, one or more additional criteria may optionally be considered in determining whether to promote or demote the ranking of a search result document based on the overall bias measure. For example, one or more criteria that take into account query dependent measures for the given document and/or other search result documents, such as navigational measures, may optionally be utilized. Also, for example, one or more criteria may take into account whether the given document and/or other search result documents are "fresh" documents recently added to the index 125.

In some implementations, in determining whether to promote the ranking of the given document based on the overall bias measure, the overall bias measure of the given document is compared to the overall bias measure of a more prominently ranked document that is more prominently ranked than the given document based on other ranking signals. The overall bias measure of a more prominently ranked document may be determined, for example, based on steps 615, 620, and 625. If the overall bias measure of the given document is more indicative of likelihood of interaction than the overall bias measure of the more prominently ranked document, and if one or more other criteria are optionally met, the ranking of the given document may be promoted. In some implementations, the one or more other criteria may include that a ratio of the overall bias measure of the given document to the overall bias measure of the more prominently ranked document satisfies a threshold. For example, in some of those implementations the ratio must be greater than 1.2.

In some implementations, the one or more other criteria may include that a navigational measure of the more prominently ranked document is below a threshold and/or that a comparison of a navigational measure of the given document and the navigational measure of the more prominently ranked document satisfies one or more thresholds. A navigational measure for a document is generally indicative of a selection rate of the document for the search query received at step 600. For example, a first document that is selected 1000 times for a search query may have a higher navigational measure for that search query than a second document that is selected 500 times for that search query. In some implementations, the navigational measure of the more prominently ranked document must be below a threshold before the ranking of the given document is promoted. In some implementations, comparison of the navigational measure of the given document and the navigational measure of the more prominently ranked document must satisfy one or more thresholds before the ranking of the given document is promoted. In some of those implementations, the one or more thresholds may optionally take into account the overall bias measure of the given document and the overall bias measure of the more prominently ranked document.

In some implementations, in determining whether to promote the ranking of the given document based on the overall bias measure, the overall bias measure may be adjusted by ignoring or weighting less heavily one or more of the bias measures identified at step 620, based on comparison of a quantity of selections of the given document (e.g., by all users and/or users having the user attribute(s) associated with the bias measures) and a quantity of selections by users of the more prominently ranked document. Such adjustment of the overall bias measure may minimize likelihood of promotion of the given document over the more prominently ranked document when the more prominently ranked document is a "fresh" document. In other words, if the more prominently ranked document is a document that has recently been created, it may not yet have a prominent overall bias measure and/or navigational measure. Comparison of a quantity of selections of the given document and a quantity of selections by users of the more prominently ranked document may prevent promotion of the given document over the more prominently ranked document in certain situations in which it may not be desirable to promote the given document over the more prominent document.

In some implementations, in determining the extent of promotion of the given document, the score for the given document (based on other ranking signals) may be compared to the score for the more prominently ranked document (based on other ranking signals), and the score for the given document boosted based on the comparison. For example, the score for the more prominently ranked document may be divided by the score for the given document to obtain a boost factor, and the score for the given document may boosted by multiplying the score for the given document by the boost factor. Other techniques may be utilized to promote and/or demote the given document.

In some implementations, in determining whether to demote the ranking of the given document based on the overall bias measure (e.g., when the overall bias measure is indicative of a bias against the given document), the overall bias measure of the given document is compared to the overall bias measure of a less prominently ranked document. If the overall bias measure of the given document is less indicative of likelihood of interaction than the overall bias measure of the less prominently ranked document, and if one or more other criteria are optionally met, the ranking of the given document may be demoted. In some implementations, the one or more other criteria may include that a ratio of the overall bias measure of the given document to the overall bias measure of the more prominently ranked document satisfies a threshold. For example, in some of those implementations the ratio must be less than 0.8. In some implementations, the one or more other criteria may include that a navigational measure of the less prominently ranked document is above a threshold and/or that a comparison of a navigational measure of the given document and the navigational measure of the less prominently ranked document satisfies one or more thresholds.

One or more of the steps of FIG. 6 may be repeated for each of a plurality of additional search result documents to determine rankings of those documents based on the overall bias measures of those documents. For example, one or more of the steps of FIG. 6 may be repeated for one or more of the top X search results documents, such as all search result documents besides the highest ranked search result document.

Search results may be provided that are based on the rankings of the search result documents associated with the search results. For example, the search system 102 may transmit the search results to the client device 106 in a form that may be provided to the user. For example, the search results 108 may be transmitted as a search results web page to be displayed via the browser 107 executing on the client device 106 and/or as one or more search results conveyed to a user via audio. As described herein, the search results may be ranked based on the rankings of the corresponding search result documents. For example, search results corresponding to the highest ranked search result document may be presented most prominently.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 7:
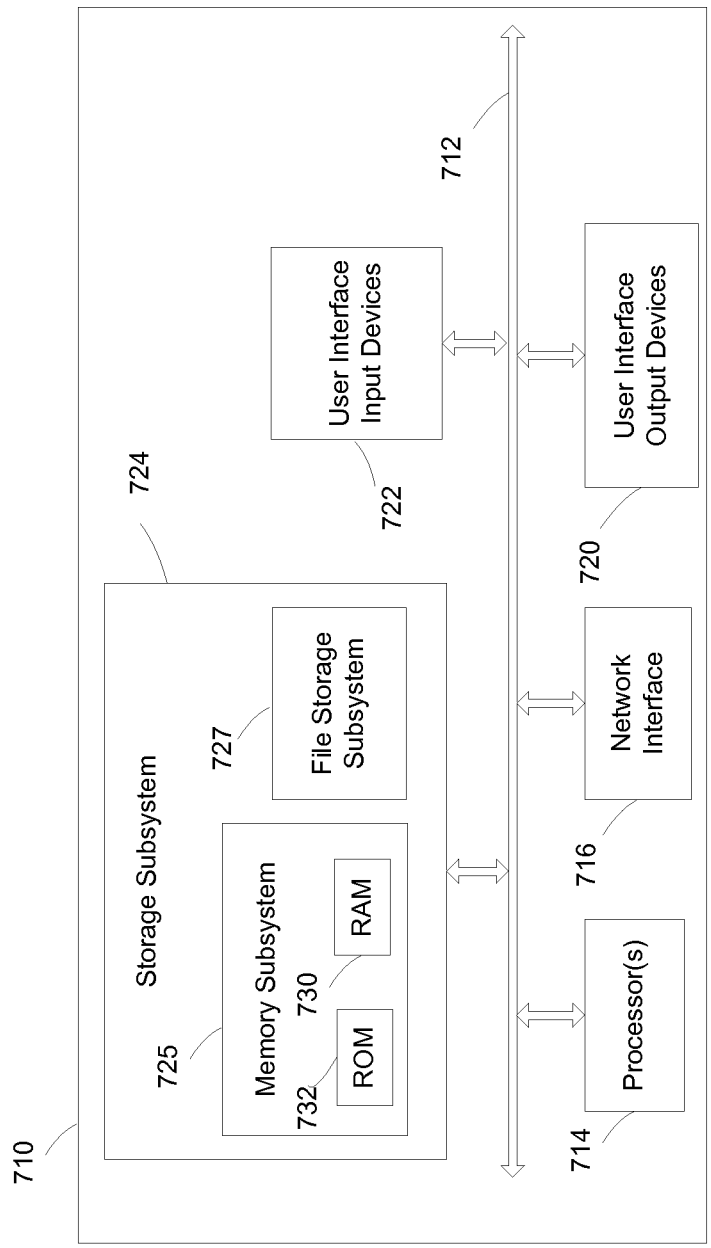
FIG. 7 illustrates an example architecture of a computer system.

The search system 102, the document attributes engine 130, the user attributes engine 140, and/or one or more additional components of the example environment of FIG. 1 may each include memory for storage of data and software applications, a processor for accessing data and executing applications, and components that facilitate communication over a network. In some implementations, such components may include hardware that shares one or more characteristics with the example computer system that is illustrated in FIG. 7. The operations performed by one or more components of the example environment may optionally be distributed across multiple computer systems. For example, the steps performed by the search system 102 may be performed via one or more computer programs running on one or more servers in one or more locations that are coupled to each other through a network.

Many other configurations are possible having more or fewer components than the environment shown in FIG. 1. For example, in some environments the document bias module 112 may not be a separated module of the ranking engine 110. Also, for example, in some implementations the document attributes and bias measures database 156 may be included in the index 125. Also, for example, in some implementations one or more of the components 130, 140, 152, 154, and 156 may be included as part of the search system 102.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform one or more of the methods described herein such as, for example, the methods of FIGS. 2, 4, and/or 6.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 724 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 724 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    identifying search result documents for a query submitted by a user;
    identifying one or more user attributes associated with the user;
    identifying, for a given document of the search result documents, a set of one or more of the user attributes that are each associated with the given document;
    identifying, for each of the user attributes of the set, a bias measure for the given document,
        wherein the bias measure for a user attribute of the set is based on a quantity of indicated interactions with the given document by a set of users associated with the user attribute compared to a second quantity of indicated interactions with the given document by a second set of users, wherein the second set of users include users non-associated with the user attribute, and wherein the indicated interactions with the given document include interactions with the given document independent of the query;
    determining an overall bias measure for the given document based on the bias measures for the user attributes of the set; and
    determining a ranking of the given document for the query based on the overall bias measure.

2. The computer-implemented method of claim 1, further comprising:
    identifying, for a second document of the search result documents, an additional set of one or more of the user attributes that are each associated with the second document;
    identifying, for each of the user attributes of the additional set, a second document bias measure for the second document;
    determining a second document overall bias measure for the second document based on the second document bias measures for the user attributes of the additional set; and
    determining a ranking of the second document based on the second document overall bias measure.

3. The computer-implemented method of claim 2, wherein one or more of the user attributes of the set are not present in the additional set.

4. The computer-implemented method of claim 2, wherein the set and the additional set include one or more same of the user attributes.

5. The computer-implemented method of claim 2, wherein determining the ranking of the given document for the query is further based on the second document overall bias measure for the second document.

6. The computer-implemented method of claim 5, wherein determining the ranking of the given document for the query includes:
    comparing the overall bias measure for the given document and the second document overall bias measure for the second document; and
    determining the ranking of the given document based on the comparison.

7. The computer-implemented method of claim 5, further comprising identifying the second document of the search result documents based on a rank of the second document for the query relative to the given document, the rank based on one or more factors independent of the overall bias measure and the second document overall bias measure.

8. The computer-implemented method of claim 5, further comprising:
    identifying a second document navigational measure of the second document for the query;
    wherein determining the ranking of the given document for the query is further based on the second document navigational measure of the second document.

9. The computer-implemented method of claim 8, further comprising:
    identifying a navigational measure of the given document for the query;
    wherein determining the ranking of the given document for the query is further based on comparison of the navigational measure of the given document and the second document navigational measure of the second document.

10. The computer-implemented method of claim 1, further comprising:

identifying a second document navigational measure, for the query, of a second document of the search result documents; and identifying a navigational measure of the given document for the query;

wherein determining the ranking of the given document for the query is further based on comparison of the navigational measure of the given document and the second document navigational measure of the second document.

11. The computer-implemented method of claim 1, wherein one or more of the user attributes are based on documents indicated as interacted with by the user, the documents including documents in addition to the search result documents for the query.

12. A computer-implemented method, comprising:

identifying a first user attribute;

identifying a given document;

identifying first user attribute indicated interactions with the given document by a first set of users associated with the first user attribute, the first user attribute indicated interactions including indicated interactions with the given document in response to more than one query;

identifying additional indicated interactions with the given document by a second set of users, the second set of users including users non-associated with the first user attribute and the indicated interactions including indicated interactions with the given document in response to more than one query;

determining a bias measure for the given document for the first user attribute, the determining the bias measure based on comparison of the first user attribute indicated interactions and the additional indicated interactions wherein determining the bias measure includes:

comparing a quantity of the first user attribute indicated interactions with a larger quantity of indicated interactions by the first set of users, the larger quantity of indicated interactions including interactions with documents in addition to the given document, and comparing a second quantity of the additional indicated interactions with a second larger quantity of indicated interactions by the second set of users, the second larger quantity of indicated interactions including interactions with the documents in addition to the given document; and associating the bias measure for the first user attribute with the given document.

13. The computer-implemented method of claim 12, further comprising:

identifying a second user attribute;

identifying second user attribute indicated interactions with the given document by a third set of users associated with the second user attribute, the second user attribute indicated interactions including indicated interactions with the given document in response to more than one query;

determining a second user attribute bias measure for the given document for the second user attribute, the determining the second user attribute bias measure based on comparison of the third user attribute indicated interactions and the additional indicated interactions; and associating the second user attribute bias measure for the second user attribute with the given document.

14. The computer-implemented method of claim 13, wherein the third set of users includes one or more users not present in the set of users.

15. A system including memory and one or more processors operable to execute instructions stored in the memory, comprising instructions to:

identify search result documents for a query submitted by a user;

identify one or more user attributes associated with the user;

identify, for a given document of the search result documents, a set of one or more of the user attributes that are each associated with the given document;

identify, for each of the user attributes of the set, a bias measure for the given document, wherein the bias measure for a user attribute of the set is based on a quantity of indicated interactions with the given document by a set of users associated with the user attribute compared to a second quantity of indicated interactions with the given document by a second set of users, wherein the second set of users include users non-associated with the user attribute, and wherein the indicated interactions with the given document include interactions with the given document independent of the query;

determine an overall bias measure for the given document based on the bias measures for the user attributes of the set; and determine a ranking of the given document for the query based on the overall bias measure.

16. The system of claim 15, wherein the instructions further include instructions to:

identify, for a second document of the search result documents, an additional set of one or more of the user attributes that are each associated with the second document;

identify, for each of the user attributes of the additional set, a second document bias measure for the second document;

determine a second document overall bias measure for the second document based on the second document bias measures for the user attributes of the additional set; and determine a ranking of the second document based on the second document overall bias measure.

17. The system of claim 16, wherein one or more of the user attributes of the set are not present in the additional set.

18. The system of claim 16, wherein the instructions to determine the ranking of the given document for the query include instructions to determine the ranking of the given document for the query based on the second document overall bias measure for the second document.

19. The system of claim 16, wherein the instructions further include instructions to:

identify a second document navigational measure of the second document for the query; and wherein the instructions to determine the ranking of the given document for the query include instructions to determine the ranking of the given document for the query based on the second document navigational measure of the second document.

* * * * *